(12) United States Patent
Henrio et al.

(10) Patent No.: US 10,183,450 B2
(45) Date of Patent: Jan. 22, 2019

(54) METHOD FOR IMPREGNATION OF A FIBROUS PREFORM AND DEVICE FOR IMPLEMENTATION OF THE SAID METHOD

(71) Applicants: SNECMA, Paris (FR); SAFRAN, Paris (FR)

(72) Inventors: Philippe Henrio, Lisses (FR); Thierry Godon, Sevran (FR)

(73) Assignees: SAFRAN AIRCRAFT ENGINES, Paris (FR); SAFRAN, Paris (FR)

( * ) Notice: Subject to any disclaimer, the term of this patent is extended or adjusted under 35 U.S.C. 154(b) by 78 days.

(21) Appl. No.: 15/100,551

(22) PCT Filed: Nov. 25, 2014

(86) PCT No.: PCT/FR2014/053032
§ 371 (c)(1),
(2) Date: May 31, 2016

(87) PCT Pub. No.: WO2015/082801
PCT Pub. Date: Jun. 11, 2015

(65) Prior Publication Data
US 2016/0297153 A1    Oct. 13, 2016

(30) Foreign Application Priority Data
Dec. 4, 2013  (FR) .................................... 13 62102

(51) Int. Cl.
*B29C 70/44* (2006.01)
*B30B 1/00* (2006.01)
(Continued)

(52) U.S. Cl.
CPC ............ *B29C 70/443* (2013.01); *B29C 43/10* (2013.01); *B30B 1/003* (2013.01);
(Continued)

(58) Field of Classification Search
None
See application file for complete search history.

(56) References Cited

U.S. PATENT DOCUMENTS

| | | |
|---|---|---|
| 4,338,070 A | 7/1982 | Nava |
| 5,204,042 A | 4/1993 | James et al. |

(Continued)

FOREIGN PATENT DOCUMENTS

| | | |
|---|---|---|
| CN | 101242947 A | 8/2008 |
| DE | 10 2009 039 116 A1 | 4/2011 |

(Continued)

OTHER PUBLICATIONS

International Search Report as issued in International Patent Application No. PCT/FR2014/053032, dated Mar. 6, 2015.
(Continued)

*Primary Examiner* — Monica A Huson
(74) *Attorney, Agent, or Firm* — Pillsbury Winthrop Shaw Pittman LLP

(57) ABSTRACT

A method of impregnating a fiber preform with an impregnation composition, includes applying a liquid on a structure, the structure including a chamber in which a fiber preform for impregnating is present, the chamber being defined between a rigid support on which the fiber preform is placed and a wall, the wall having a face situated facing the fiber preform; and an impregnation composition for impregnating the fiber preform, the impregnation composition being present in the chamber; the liquid being applied against the wall on its side opposite from the chamber, the wall being configured so that its face situated facing the fiber preform conserves its shape during the application of the liquid, the applied liquid enabling sufficient pressure to be
(Continued)

created to move the wall towards the rigid support and impregnate the fiber preform with the impregnation composition.

11 Claims, 3 Drawing Sheets

(51) Int. Cl.
 *B29C 43/10* (2006.01)
 *B29C 43/32* (2006.01)
 *B29C 43/36* (2006.01)
 *B29L 31/08* (2006.01)
(52) U.S. Cl.
 CPC ............... *B29C 2043/3238* (2013.01); *B29C 2043/3652* (2013.01); *B29L 2031/082* (2013.01)

(56) References Cited

U.S. PATENT DOCUMENTS

| | | |
|---|---|---|
| 5,382,150 A | 1/1995 | Henrio |
| 5,820,894 A | 10/1998 | Kreutzer |
| 7,866,969 B2 | 1/2011 | Ruiz et al. |
| 10,016,949 B2 | 7/2018 | Pridie |
| 2009/0001219 A1* | 1/2009 | Golecki ............... B29C 70/48 244/133 |
| 2011/0195230 A1 | 8/2011 | Hanson |

FOREIGN PATENT DOCUMENTS

| | | |
|---|---|---|
| EP | 2 221 167 A1 | 8/2010 |
| JP | S56-111638 A | 9/1981 |
| JP | S63-178028 A | 7/1988 |
| JP | 2009-028939 A | 2/2009 |
| JP | 2009-045927 A | 3/2009 |
| RU | 2465140 C2 | 10/2012 |
| RU | 2479424 C2 | 4/2013 |
| RU | 2480334 C1 | 4/2013 |
| WO | WO 2007/003011 A1 | 1/2007 |
| WO | WO 2008/099207 A1 | 8/2008 |

OTHER PUBLICATIONS

International Preliminary Report on Patentability and the Written Opinion of the International Searching Authority as issued in International Patent Application No. PCT/FR2014/053032, dated Jun. 7, 2016.

\* cited by examiner

METHOD FOR IMPREGNATION OF A FIBROUS PREFORM AND DEVICE FOR IMPLEMENTATION OF THE SAID METHOD

CROSS-REFERENCE TO RELATED APPLICATIONS

This application is the U.S. National Stage of PCT/FR2014/053032, filed Nov. 25, 2014, which in turn claims priority to French patent application number 1362102, filed Dec. 4, 2013. The content of these applications are incorporated herein by reference in their entireties.

BACKGROUND OF THE INVENTION

The invention relates to methods of impregnating a fiber preform with an impregnation composition, to methods of densifying such impregnated fiber preforms, and to associated devices.

The "poly-flex" method is known in which a fiber preform is draped on tooling having a surface with the profile desired for the final product. The preform is then covered by a deformable impermeable membrane and resin is injected between the membrane and the preform. On the other side of the membrane, isostatic pressure is exerted against the membrane by a fluid that serves to deform the face of the membrane situated facing the preform. The fluid forces the resin between the fibers and maintains pressure during a stage of curing the resin. A drawback of the "poly-flex" method is that it enables the profile and the definition of the surface of the part that is to be fabricated to be controlled on one side only of the part. The surface of the resulting part that is situated beside the membrane may be rougher and its profile is not always under control. Consequently, the "poly-flex" method can be found to be not entirely satisfactory for fabricating turbine engine blades. The "poly-flex" method is described in U.S. Pat. No. 7,866,969 B2.

Also known is the resin transfer molding (RTM) method in which the tooling comprises two half-shells that confine a cavity when they are placed one on the other. The fiber preform is inserted in the cavity between the two half-shells and is then injected with the resin. The resin is polymerized while keeping the two half-shells closed. A drawback of that method is associated with the resin shrinking during cross-linking, which can lead to a loss of pressure inside the cavity and to micropores forming that can affect the mechanical strength of the resulting part. Furthermore, in the resin transfer molding (RTM) method, it is possible for the impregnation of the preform by the resin to be incomplete. Specifically, in that method, the resin is injected via distinct points and it needs to pass through the fiber preform in order to infiltrate the entire preform, which can lead to certain zones of the preform not being impregnated.

Also known is U.S. Pat. No. 5,382,150, which describes a method in which a stack of pre-impregnated plies is consolidated between two half-shells. The method described in U.S. Pat. No. 5,382,150 also includes a curing step in an autoclave, which can be expensive.

Also known is US 2011/0195230, which describes curing a laminate.

There thus exists a need for novel methods for controlling the profile and the definition of two opposite faces of an impregnated fiber preform.

There also exists a need for novel methods for controlling the profile and the definition of two opposite faces of a composite material part comprising a fiber preform densified by a matrix.

There also exists a need to have novel methods enabling parts to be made out of composite material and presenting little microporosity.

There also exists a need to have novel devices specially adapted to performing such methods.

OBJECT AND SUMMARY OF THE INVENTION

To this end, in a first aspect, the invention provides a method of impregnating a fiber preform with an impregnation composition, the method including the following steps:
a) applying a fluid on a structure, the structure comprising:
  a chamber in which a fiber preform for impregnating is present, the chamber being defined between a rigid support on which the fiber preform is placed and a wall, the wall having a face situated facing the fiber preform; and
  an impregnation composition, for impregnating the fiber preform, the impregnation composition being present in the chamber;
  the fluid being applied against the wall on its side opposite from the chamber, the wall being configured so that its face situated facing the fiber preform conserves its shape during the application of the fluid, the applied fluid enabling sufficient pressure to be created to move the wall towards the rigid support and impregnate the fiber preform with the impregnation composition.

The term "rigid support" should be understood as meaning that the support presents sufficient rigidity to avoid being deformed while performing the method of the invention. The rigid support thus imparts its shape to the face of the impregnated preform that is situated facing said support.

Furthermore, the wall is configured so that its face situated facing the fiber preform conserves its shape during impregnation of the fiber preform by the impregnation composition as a result of the fluid being applied. Furthermore, the wall is configured so that its face situated facing the fiber preform conserves its shape while it is being applied against the fiber preform impregnated with the impregnation composition.

Thus, the wall makes it possible to impart its shape to the face of the impregnated fiber preform that is situated facing the wall.

The present invention thus advantageously makes it possible to obtain fiber preforms that are impregnated by an impregnation composition while maintaining the definition of both opposite faces of the impregnated preform. In the present invention, the rigid support and the wall constitute two molding shells for the impregnated preform. Specifically, the rigid support and the wall both present sufficient rigidity to impart their shapes to the impregnated fiber preform and thus to the part that is obtained after densification of the preform. In particular, the wall presents sufficient rigidity for its face situated facing the fiber preform to conserve its shape during application of the fluid.

Furthermore, the application of the fluid, which leads to the pressure being exerted against the wall during impregnation, advantageously makes it possible to reduce the risk of the preform being incompletely impregnated.

Once impregnation has been performed, the face of the impregnated fiber preform situated facing the wall and the face of the impregnated fiber preform situated facing the rigid support may have the same shape or they may have different shapes.

In an implementation, the wall may be compressed as a result of the fluid being applied, while its face situated facing the fiber preform conserves its shape. The compression of the wall may advantageously be elastic. By way of example, the compression of the wall may result in the thickness of the wall being decreased by not more than 0.1%.

Unless mentioned to the contrary, the thickness of the wall is defined as the smallest transverse dimension of the wall.

In a variant, the wall is such that it is not compressed as a result of the fluid being applied. Thus, in an implementation, the wall need not suffer any deformation as a result of the fluid being applied.

In an implementation, the wall may be in the form of a membrane, having one or more stiffener elements fastened thereto, e.g. adhesively. The stiffener elements may be present on one side only of the membrane, or in a variant on both sides of the membrane. The stiffener elements may be present beside the chamber and/or beside the side opposite from the chamber. By way of example, the stiffener elements may be in the form of a set of reinforcing fibers, the reinforcing fibers including a metal, for example, the reinforcing fibers may be made of steel, for example.

Preferably, the wall may present a Young's modulus lying in the range 1 gigapascal (GPa) to 250 GPa, preferably in the range 50 GPa to 200 GPa.

By way of example, the thickness of the wall may lie in the range 0.5 millimeters (mm) to 50 mm.

In an embodiment, the wall may include, and in particular be constituted by, a material selected from: metal compounds, e.g. steel; metals, e.g. aluminum; composite materials with a thermosetting resin or a thermoplastic resin or a ceramic resin (i.e. a resin filled with a ceramic powder); optionally reinforced organic resins; thermosetting resins or thermoplastic resins; ceramics, e.g. aluminum oxide, solid materials in the form of foams; and mixtures thereof.

The materials used for constituting the wall are naturally suitable for use in the context of the method of the invention, and in particular they are compatible with the temperature used during the method of the invention.

In an implementation, the wall may be constituted by a single material. In a variant, the wall may comprise a plurality of different materials.

In an implementation, prior to step a), the method may include a step of injecting the impregnation composition into the chamber.

In an implementation, the impregnation composition may be injected into the chamber after placing the fiber preform on the support, and the impregnation composition may be injected between the fiber preform and the wall.

In an implementation, the fiber preform need not be impregnated with the impregnation composition prior to the fluid being applied. Under such circumstances, application of the fluid serves to implement partial or complete impregnation of the fiber preform with the impregnation composition.

In a variant, the fiber preform may already be partially impregnated with the impregnation composition prior to applying the fluid. Under such circumstances, application of the fluid serves to increase the impregnation of the fiber preform with the impregnation composition, and by way of example to ensure that the fiber preform is impregnated completely with the impregnation composition.

Thus, after applying the fluid, the impregnation of the fiber preform with the impregnation composition may be partial or complete.

The fiber preform may be of any kind. By way of example, the fiber preform may be a woven fiber preform, e.g. a 3D woven fiber preform.

By way of example, the fiber preform may have present therein fibers that are made of ceramic, e.g. of silicon carbide (SiC), of alumina oxide, and/or fibers made of carbon, glass, or aramid.

In an implementation, the impregnation composition, prior to application of the liquid, may overlie the fiber preform over at least half of the length of the fiber preform. Thus, prior to application of the fluid, the impregnation composition may overlie the fiber preform over at least 50%, and preferably at least 75%, more preferably substantially all of the length of the fiber preform.

Unless specified to the contrary, the length of the fiber preform corresponds to its longest dimension.

The fact that the impregnation composition is distributed over the majority of the length of the preform advantageously enables the preform to be infiltrated over a large area, consequently making it possible to obtain impregnation that is improved, in particular compared with the resin transfer molding (RTM) method. Furthermore, this makes it possible to use resins that are relatively viscous and possibly thermoplastic resins such as polyetheretherketone (PEEK) in order to perform the impregnation, thus advantageously enabling fabrication time to be shortened.

By way of example, the impregnation composition may be a resin, e.g. a thermosetting resin, e.g. an epoxy, bismaleimide, polyimide, polyester, or vinyl-ester resin.

In a variant, the impregnation composition may be a ceramic slip, i.e. a ceramic powder present in an aqueous solution, the powder comprising alumina oxide, by way of example.

The fluid is preferably a liquid. The fluid may be different from the impregnation composition. The fluid applied against the wall preferably does not come into contact with the impregnation composition. The fluid applied against the wall preferably does not penetrate into the chamber.

By way of example, the fluid may be selected from: water, oils, e.g. organic oils or silicone oils, and mixtures thereof.

In a variant, the fluid may be a gas under pressure, which gas may be selected for example from: compressed air and nitrogen.

In an implementation, the structure may also include an impermeable membrane covering the wall, and the wall may be situated between the chamber and the impermeable membrane, and the fluid may be applied against the impermeable membrane on its side opposite from the chamber.

In an implementation, the impermeable membrane may cover all of the wall.

The impermeable membrane is impermeable to the applied fluid. The impermeable membrane may be flexible. In other words, applying the fluid against the impermeable membrane may enable the impermeable membrane to be deformed so that it takes up the shape of the wall.

Preferably, the impermeable membrane may include, and in particular be constituted by, a material selected from: optionally reinforced silicones; thermoplastic polymers, e.g. polyamide, polyethylene polyterephthalate (PET), Teflon® (PTFE), or polyimide; and mixtures thereof.

The impermeable membrane may be a single layer or in a variant it may be a multilayer membrane. The layer(s) constituting the impermeable membrane may be in the form of a film. The impermeable membrane may be made of a single material. In a variant, the impermeable membrane may comprise a plurality of different materials. In an implementation, the impermeable membrane is in the form of a metal foil, e.g. made of titanium, the foil possibly presenting a thickness of several tenths of a millimeter.

In an implementation, the impermeable membrane may already be in contact with the wall even before the fluid is applied. In a variant, the impermeable membrane is put into contact with the wall after the fluid has been applied. In yet another variant, an intermediate layer may be present between the wall and the impermeable membrane so as to prevent contact between the wall and the impermeable membrane.

The present invention also provides a method of fabricating a part comprising a fiber preform densified by a matrix, the method being characterized in that it includes the following steps:

b) densifying a fiber preform that has been impregnated by an impregnation composition that is a densification matrix precursor in order to obtain a part comprising a fiber preform densified by a matrix, the impregnated preform being obtained by performing a method as defined above.

As mentioned above for the impregnated preform, the rigid support serves to impart its shape to the face of the part situated facing said support. Likewise, the wall enables its shape to be imparted to the face of the part situated facing the wall. Specifically, the wall is configured so that its face situated facing the fiber preform conserves its shape during the densification step. The wall and the rigid support thus act as molding shells enabling the profiles of two opposite faces of the part to be controlled.

The face of the resulting part situated facing the wall and the face of the resulting part situated facing the rigid support may have the same shape, or they may have different shapes.

In an implementation, the densification may be performed while maintaining the pressure exerted by the wall on the impregnated preform as a result of the application of the fluid.

Maintaining isostatic pressure on the wall during densification advantageously makes it possible to avoid pores being formed by a gaseous phase being precipitated in the impregnation composition, and consequently enables the mechanical strength of the resulting part to be increased.

By way of example, the part may constitute a turbine engine blade, preferably a fan blade.

The impregnated fiber preform may be densified by curing the impregnation composition. Advantageously, the curing of the impregnation composition need not be performed within an autoclave.

The fact of avoiding curing within an autoclave advantageously makes it possible to reduce the cost of performing the densification step.

The present invention also provides a device for performing the above-defined method, the device comprising:
  a structure including a chamber defined between a rigid support and a wall, the wall having a face situated facing the rigid support, the chamber defining an internal volume in which a fiber preform impregnated by a matrix precursor impregnation composition is to be present, the chamber being configured to be subjected to heat treatment for the purpose of densifying the fiber preform; and
  a fluid injection device configured to apply a fluid against the wall on its side opposite from the chamber;
  the device being configured so that the application of the fluid against the wall on its side opposite from the chamber does not change the shape of the face of the wall situated facing the rigid support and generates sufficient pressure on the wall to move it towards the support and reduce the internal volume of the chamber.

In an embodiment, the fluid injection device may be configured to apply a liquid against the wall on its side opposite from the chamber.

In an embodiment, the structure may also include an impermeable membrane covering the wall, and the wall may be situated between the chamber and the impermeable membrane, and the fluid injection device may be configured to apply the fluid against the impermeable membrane on its side opposite from the chamber.

In an embodiment, the device may also include a heater member configured to perform heat treatment on the impregnation composition enabling the fiber preform to be densified.

BRIEF DESCRIPTION OF THE DRAWINGS

Other characteristics and advantages of the invention appear from the following description of particular implementations of the invention given as non-limiting examples and with reference to the accompanying drawings, in which.

DETAILED DESCRIPTION OF IMPLEMENTATIONS

With reference to FIGS. 1 to 4, there follows a description of various steps of an impregnation method of the invention.

Figure 1:
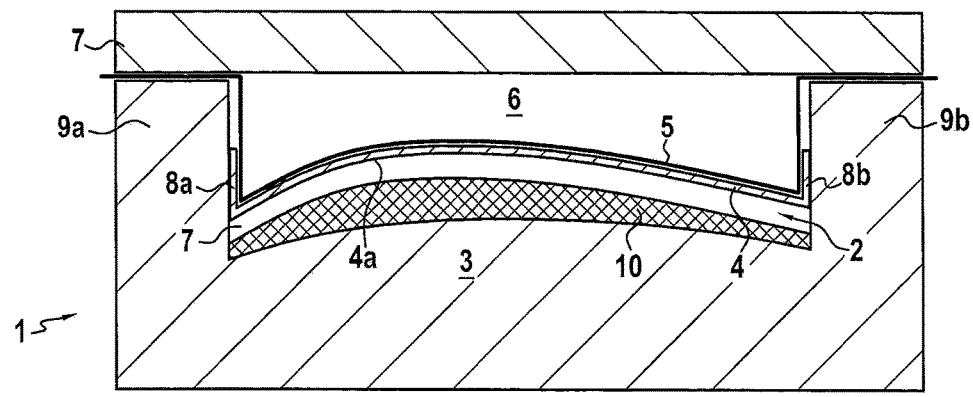
FIG. 1 is a fragmentary and diagrammatic view of the fiber preform that is to be impregnated by the method of the invention, shown placed in a device of the invention.

FIG. 1 shows a device 1 of the invention comprising a rigid support 3 on which the fiber preform 10 is placed. A chamber 2 in which the fiber preform 10 is present is defined by the rigid support 3 and the wall 4. Furthermore, the chamber 2 is defined by side walls 9a and 9b of the support 3. As shown, the chamber 2 has an empty volume 7 situated between the fiber preform 10 and the wall 4. The wall 4 presents a face 4a situated facing the fiber preform 10.

The wall 4 may be moved relative to the support 3 when sufficient pressure is exerted thereon. In the example shown, the wall 4 has two ends 8a and 8b co-operating with the side walls 9a and 9b. The ends 8a and 8b in cooperation with the side walls 9a and 9b serve to guide the wall 4 relative to the support 3. By way of example, these ends 8a and 8b may constitute upwardly extending edges, as shown. It would not go beyond the ambit of the present invention for the ends 8a and 8b to be of some other shape suitable for co-operating with the walls 9a and 9b in order to enable the wall 4 to move relative to the support 3.

In the example shown, an impermeable membrane 5 covers the wall 4, the wall 4 being situated between the chamber 2 and the impregnable membrane 5. By way of example, the impregnable membrane 5 may be flush with the wall 4. As shown, the impregnable membrane 5 may cover the wall 4 in full. It would not go beyond the ambit of the present invention for the impregnable membrane 5 to be omitted.

Opposite from the chamber 2, the device 1 also includes a cavity 6 overlying the wall 4. The cavity 6 may be defined by a lid 7. As described in detail below, the cavity 6 is for filling with the fluid when performing the impregnation method of the invention. The device 1 also includes a fluid injection device (not shown) enabling the fluid to be applied in the cavity 6.

Figure 2:
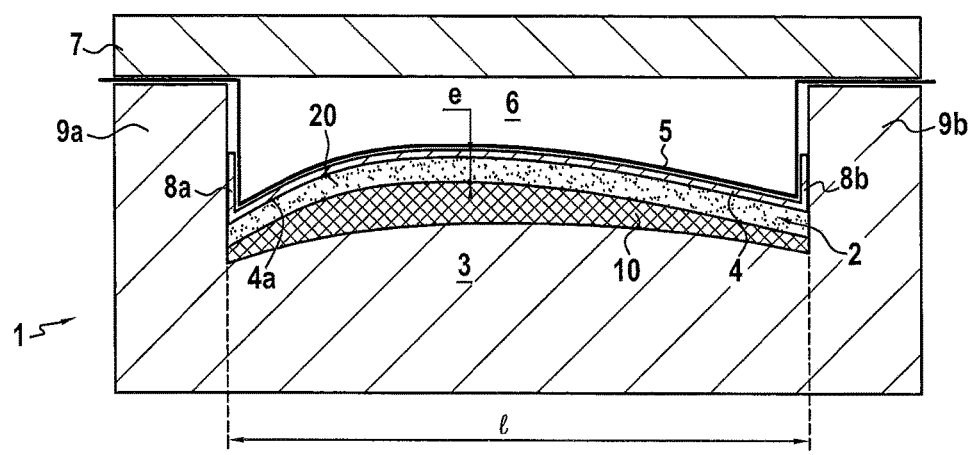
FIG. 2 is a fragmentary and diagrammatic view of the FIG. 1 assembly after injecting the impregnation composition.

FIG. 2 shows the FIG. 1 device as obtained after performing a step of injecting an impregnation composition in the form of a resin 20 into the chamber 2. As shown, the resin 20 is injected into the empty volume 7 of the chamber 2. In the example shown, the resin 20 was injected after placing the fiber preform 10 on the support 3 between the preform 10 and the wall 4. In a variant that is not shown, the impregnation composition could be present between the fiber preform and the support. Thus, in a variant that is not shown, the impregnation composition could be inserted into the chamber prior to placing the fiber preform on top of it.

Once the resin 20 has been injected, it may overlie the fiber preform 10 over substantially the entire length λ of the fiber preform 10.

As mentioned above, such a configuration advantageously enables the resin 20 to infiltrate the preform 10 over a large area, thereby improving impregnation.

By way of example, when the part that is to be obtained is a fan blade, the resin 20, prior to applying the fluid, may be situated beside the face of the fiber preform 10 that is to form the suction side of the blade.

The layer of resin 20 present in the chamber 2 and not impregnating the fiber preform 10 may present a thickness e, as shown.

Figure 3:
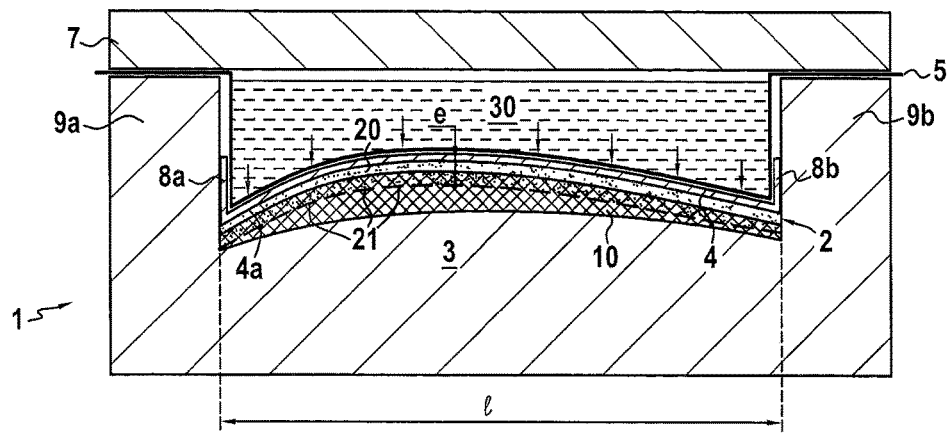
FIG. 3 is a fragmentary and diagrammatic view of the FIG. 2 assembly after applying the fluid.

Once the resin 20 is present in the chamber 2, a fluid 30, e.g. a liquid, is injected into the cavity 6 by the fluid injection device. The assembly that is obtained after adding the fluid 30 to the cavity 6 is shown in FIG. 3. The fluid 30 is applied against the wall 4 on its side opposite from the chamber 2. In other words, once the fluid 30 is applied against the wall 4, the wall 4 is present between the chamber 2 and the fluid 30. In the example shown, the fluid 30 is pressed against the wall 4 once injection of the resin 20 into the chamber 2 has terminated. Furthermore, in the example shown, once the fluid 30 has been applied, the impermeable membrane 5 is present between the applied fluid 30 and the wall 4.

The applied fluid 30 exerts pressure on the wall 4 through the impermeable membrane 5. The isostatic pressure of the fluid 30 forces the resin 20 through the fiber preform 10, moves the wall 4 towards the support 3, and pushes the wall 4 against the preform 10.

Application of the fluid 30 does not change the shape of the wall 4 since it is sufficiently rigid for its shape to remain unaffected by the application of the fluid 30. Thus, the application of the fluid 30 causes the wall 4 to move towards the support 3 without changing the shape of the wall 4. In particular, the face 4a of the wall 4 situated facing the fiber preform 10 conserves its shape after application of the fluid. As shown, the ends 8a and 8b of the wall 4 move towards the support 3 as a result of the fluid 30 being applied. The wall 4 presents the same shape throughout the step of impregnating the fiber preform 10 with the resin 20.

The movement of the wall 4 as a result of applying the fluid 30 leads to a reduction in the volume of the chamber 2. As shown, the thickness e of the layer of resin 20 present in the chamber 2 and not impregnating the fiber preform 10 decreases progressively as a result of the pressure exerted by the fluid 30. In parallel, the impregnation front 21 of the resin 20 inside the preform 10 progresses across the thickness of the preform 10 because of the pressure exerted by the fluid 30. The impregnation front 21 of the resin 20 in the preform 10 progresses in the travel direction of the wall 4, as shown.

Figure 4:
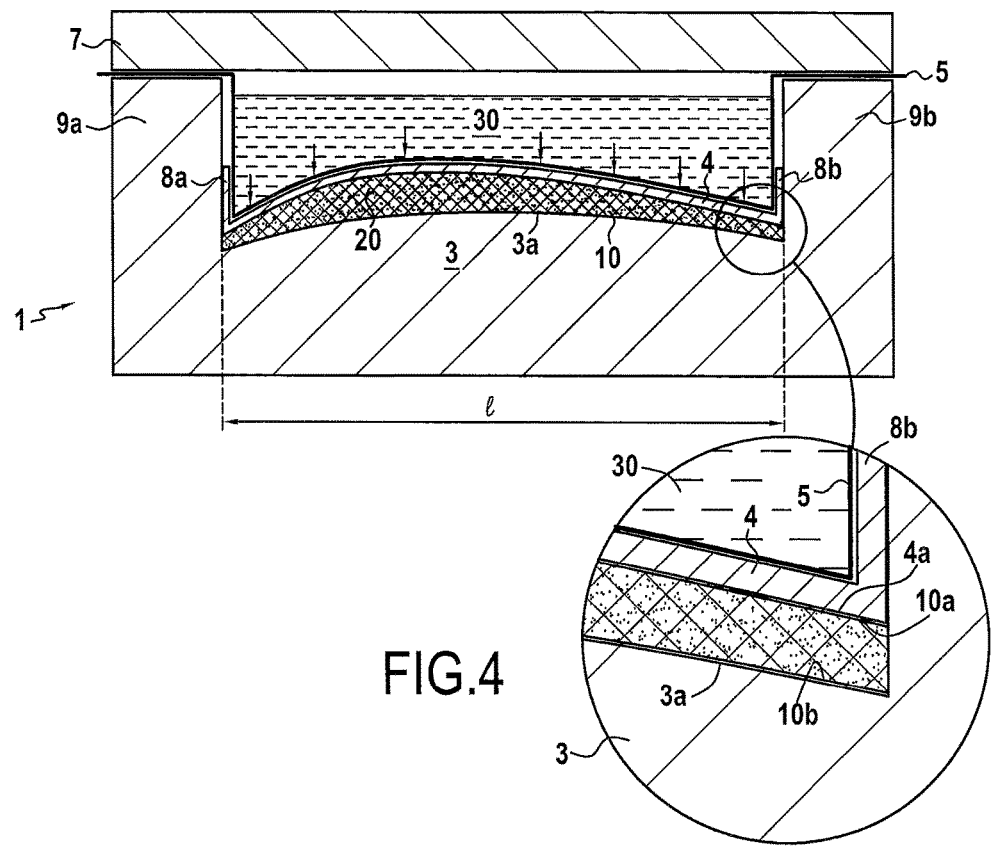
FIG. 4 is a fragmentary and diagrammatic view of the assembly obtained after impregnating the fiber preform with the impregnation composition.

Once the preform 10 is completely impregnated by the resin 20, the result shown in FIG. 4 is obtained. As mentioned above, the support 3 is sufficiently rigid to impart the shape of the face 3a of the facing support 3 to the face 10b of the impregnated preform. The wall 4 is sufficiently rigid to impart the shape of the face 4a of the facing wall 4 to the face 10a of the impregnated preform. In the example shown, the opposite faces 10a and 10b do not have the same shape, in particular they do not have the same curvature.

FIG. 4 shows the device 1 while curing the resin 20. The isostatic pressure of the fluid 30 propagates into the resin-impregnated preform and the pressure exerted by the fluid 30 is maintained while cross-linking the resin.

Figure 5:
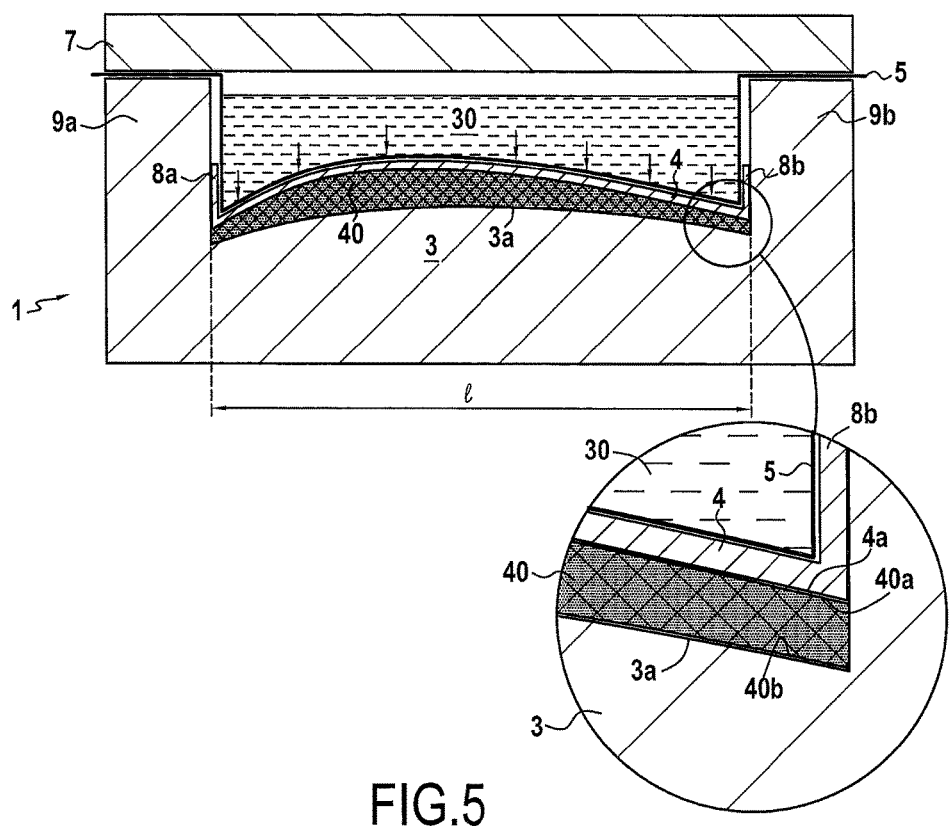
FIG. 5 is a fragmentary and diagrammatic view of the part obtained after curing the impregnation composition.

FIG. 5 shows the result that is obtained after densifying a fiber preform that has been impregnated with a resin that is a precursor of a densification matrix. As shown, a part 40 is obtained that comprises the fiber preform densified by a matrix. The support 3 is sufficiently rigid to impart the shape of the face 3a of the facing support 3 to the face 40b of the part 40. The wall 4 is sufficiently rigid to impart the shape of the face 4a of the facing wall 4 to the face 40a of the part 40. In the example shown, the opposite faces 40a and 40b do not have the same shape, and in particular they do not have the same curvature. As shown, the wall 4 acts during curing of the resin to maintain an isostatic pressure by using the fluid 30 applied against the wall 4. The fluid 30 may be unaffected by the densification step. In other words, the fluid 30 need not change shape during the densification step.

The device 1 may include a heater member (not shown) for performing the heat treatment that enables the resin to be transformed into a densification matrix.

The resulting part 40 may constitute a turbine engine blade, preferably a fan blade.

The method of the invention advantageously makes it possible to control the shape of opposite faces 40a and 40b of the resulting part 40, in particular as a result of using the wall 4 and the rigid support 3.

EXAMPLES

Example 1 (Applying a Liquid)

A fiber preform including carbon fibers and in the form of a plate having dimensions of 100×100×10 mm$^3$ was placed in a chamber defined between a rigid support made of steel and having dimensions of 150×150×50 mm$^3$ and a wall likewise made of steel and having a thickness of 2 mm.

Thereafter, a volume of 40 cubic centimeters (cm$^3$) of PR520 type epoxy resin was injected into the chamber.

Thereafter, oil was applied against the wall opposite from the chamber in order to exert a pressure of 4 bars and impregnate the preform with the resin.

After impregnation, a plate was obtained having a carbon fiber volume content equal to 60%. The temperature imposed during impregnation was 160° C.

Thereafter, a step of densifying the impregnated fiber preform was performed by heating to 180° C. in order to cross-link the resin completely.

Example 2 (Applying a Gas)

A fiber preform including carbon fibers and in the form of a plate having dimensions of 100×100×10 mm$^3$ was placed in a chamber defined between a rigid support made of steel and having dimensions of 150×150×50 mm³ and a wall likewise made of steel and having a thickness of 2 mm.

Thereafter, a volume of 40 cm³ of PR520 type epoxy resin was injected into the chamber.

Thereafter, compressed air was applied against the wall opposite from the chamber in order to exert a pressure of 4 bars and impregnate the preform with the resin.

After impregnation, a plate was obtained having a carbon fiber volume content equal to 60%. The temperature imposed during impregnation was 160° C.

Thereafter, a step of densifying the impregnated fiber preform was performed by heating to 180° C. in order to cross-link the resin completely.

The term "comprising/containing a" should be understood as "comprising/containing at least one".

The term "lying in the range . . . to . . . " should be understood as including the limits of the range.

The invention claimed is:

1. A method of impregnating a fiber preform with an impregnation composition, the method comprising:
    a) applying a liquid on a structure, the structure comprising:
       a chamber in which a fiber preform for impregnating is present, the chamber being defined between a rigid support on which the fiber preform is placed and a wall, the wall having a face situated facing the fiber preform; and
       an impregnation composition, for impregnating the fiber preform, the impregnation composition being present in the chamber;
    the liquid being applied against the wall on its side opposite from the chamber, the wall being sufficient rigid so that its face situated facing the fiber preform conserves its shape and avoid being deformed during the application of the liquid, the applied liquid enabling sufficient pressure to be created to move the wall towards the rigid support and impregnate the fiber preform with the impregnation composition.

2. A method according to claim 1, wherein, prior to step a), the method further comprises injecting the impregnation composition into the chamber.

3. A method according to claim 2, wherein the impregnation composition is injected into the chamber after placing the fiber preform on the support, and wherein the impregnation composition is injected between the fiber preform and the wall.

4. A method according to claim 1, wherein, prior to applying the liquid, the impregnation composition is superposed on the fiber preform over at least half of a length of the fiber preform.

5. A method according to claim 1, wherein the structure also includes an impermeable membrane covering the wall, and wherein the wall is situated between the chamber and the impermeable membrane, and wherein the liquid is applied against the impermeable membrane on its side opposite from the chamber.

6. A method of fabricating a part comprising a fiber preform densified by a matrix, the method comprising:
    b) densifying a fiber preform that has been impregnated by an impregnation composition that is a densification matrix precursor in order to obtain a part comprising a fiber preform densified by a matrix, the impregnated preform being obtained by performing a method according to claim 1.

7. A method according to claim 6, wherein the densification is performed while maintaining the pressure exerted by the wall on the impregnated preform as a result of the application of the liquid.

8. A method according to claim 6, wherein the part constitutes a turbine engine blade.

9. A device for performing a method according to claim 1, the device comprising:
    a structure including a chamber defined between a rigid support and a wall, the wall having a face situated facing the rigid support, the chamber defining an internal volume in which a fiber preform impregnated by a matrix precursor impregnation composition is to be present, the chamber being configured to be subjected to heat treatment for the purpose of densifying the fiber preform; and
    a liquid injection device configured to apply a liquid against the wall on its side opposite from the chamber;
    the device being configured so that the application of the liquid against the wall on its side opposite from the chamber does not change the shape of the face of the wall situated facing the rigid support and generates sufficient pressure on the wall to move it towards the support and reduce the internal volume of the chamber.

10. A device according to claim 9, wherein the structure further includes an impermeable membrane covering the wall, and wherein the wall is situated between the chamber and the impermeable membrane, and wherein the liquid injection device is configured to apply the liquid against the impermeable membrane on its side opposite from the chamber.

11. A device according to claim 9, further comprising a heater member configured to perform heat treatment on the impregnation composition enabling the fiber preform to be densified.

* * * * *